US011873982B2

(12) United States Patent
Martin et al.

(10) Patent No.: US 11,873,982 B2
(45) Date of Patent: Jan. 16, 2024

(54) VAPOR CHAMBER ELEMENT

(71) Applicant: SIGNIFY HOLDING B.V., Eindhoven (NL)

(72) Inventors: Genevieve Therese Martin, Udenhout (NL); Jiang Hong Yu, Best (NL); Derk Tiekink, Mierlo (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/925,047

(22) PCT Filed: Apr. 30, 2021

(86) PCT No.: PCT/EP2021/061483
§ 371 (c)(1),
(2) Date: Nov. 14, 2022

(87) PCT Pub. No.: WO2021/228590
PCT Pub. Date: Nov. 18, 2021

(65) Prior Publication Data

US 2023/0184422 A1 Jun. 15, 2023

(30) Foreign Application Priority Data

May 14, 2020 (EP) .................................... 20174597

(51) Int. Cl.
*F21V 29/51* (2015.01)
*F21V 29/503* (2015.01)
(Continued)

(52) U.S. Cl.
CPC ............ *F21V 29/51* (2015.01); *F21V 29/503* (2015.01); *F21V 29/508* (2015.01); *F28D 15/02* (2013.01); *F21Y 2115/10* (2016.08)

(58) Field of Classification Search
CPC ...... F21V 29/51; F21V 29/503; F21V 29/508; F28D 15/02; F28D 15/0233; F28D 15/0241; F21Y 2115/10
See application file for complete search history.

(56) References Cited

U.S. PATENT DOCUMENTS 8,506,135 B1 8/2013 Oster
2010/0175856 A1 7/2010 Meyer, Iv et al.
(Continued)

FOREIGN PATENT DOCUMENTS

CN 108119881 A * 6/2018 ............. F28D 15/04
CN 108801015 A 11/2018
(Continued)

OTHER PUBLICATIONS

Cai S et al., "With Special Capillary Liquid Flow Channels of the Heat Equalizing Plate For LED Device and LED Device", Jun. 6, 2018, Image of CN 108119881 A merged with machine English translation text. (Year: 2018).*

*Primary Examiner* — Alan B Cariaso

(57) ABSTRACT

The invention provides a vapor chamber element (1000), wherein the vapor chamber element (1000) comprises a first plate (110) and a second plate (120) with a chamber (100) in between, wherein the chamber (100) has a first height (H1), wherein the vapor chamber element (1000) further comprises bridging elements (150) bridging at least part of the first height (H1), wherein the vapor chamber element (1000) comprises a plurality of sections (130) configured along a first axis (A), wherein the plurality of sections (130) comprises (i) a bending section (131) having a first volume fraction $V_1$ of bridging elements (150), and (ii) a basic section (133) having a second volume fraction $V_2$ of bridging elements (150), wherein $2 \leq V_1/V_2$.

15 Claims, 3 Drawing Sheets

(51) Int. Cl.

| | |
|---|---|
| ***F21V 29/508*** | (2015.01) |
| ***F28D 15/02*** | (2006.01) |
| *F21Y 115/10* | (2016.01) |

(56) References Cited

U.S. PATENT DOCUMENTS

| | | | | |
|---|---|---|---|---|
| 2010/0225217 | A1 | 9/2010 | Liu | |
| 2010/0226138 | A1 | 9/2010 | Lin et al. | |
| 2010/0294200 | A1 | 11/2010 | Zhang et al. | |
| 2013/0314914 | A1 | 11/2013 | Kim et al. | |
| 2015/0138830 | A1* | 5/2015 | Yu | G02F 1/1336 362/609 |
| 2019/0354148 | A1 | 11/2019 | Delano et al. | |
| 2020/0326134 | A1* | 10/2020 | Chen | H01L 23/427 |
| 2021/0095930 | A1* | 4/2021 | Inagaki | F28D 15/0233 |

FOREIGN PATENT DOCUMENTS

| | | | | |
|---|---|---|---|---|
| EP | 2228598 | A1 | 9/2010 | |
| JP | 3192121 | U | 7/2014 | |
| JP | 2019082264 | A | 5/2019 | |
| WO | 2012013605 | A2 | 2/2012 | |
| WO | WO-2012159017 | A1 * | 11/2012 | F21K 9/00 |

* cited by examiner

VAPOR CHAMBER ELEMENT

CROSS-REFERENCE TO PRIOR APPLICATIONS

This application is the U.S. National Phase application under 35 U.S.C. § 371 of International Application No. PCT/EP2021/061483, filed on Apr. 30, 2021, which claims the benefit of European Patent Application No. 20174597.3, filed on May 14, 2020. These applications are hereby incorporated by reference herein.

FIELD OF THE INVENTION

The invention relates to a vapor chamber element. The invention further relates to a method for providing a bent vapor chamber element. The invention further relates to a bent vapor chamber element. The invention further relates to a device comprising the bent vapor chamber element.

BACKGROUND OF THE INVENTION

Vapor chambers are known in the art. For instance, US2010226138A1 describes a road lamp holder structure includes a lamp guard, an LED unit installed at the bottom of the lamp guard, and a heat dissipating device installed in lamp guard and having a base, a vapor chamber and two heat dissipating elements attached to the LED unit. The vapor chamber includes a heated section attached onto the base, two heat transmitting sections bent and extended upward from both sides of the heated section respectively, a condensing section bent and extended laterally from each of the two heat transmitting sections, two heat dissipating elements having a heated base, and heat dissipating fins disposed on the heated base. The two heated bases are attached onto external sides of the two heat transmitting sections of the vapor chamber respectively, and the two condensing sections of the vapor chamber are attached to the internal periphery of the top of the lamp guard.

SUMMARY OF THE INVENTION

Compactness of electronic components may be becoming increasingly important, for example in the context of LED lighting. With the requirements for miniaturization, new technologies and solutions may be desired for the next generations of electronic components.

The prior art may describe electronic components, such as a driver, in a housing, wherein otherwise empty space in the housing is filled up with thermal interface materials However, thermal interface materials, such as polymer-based composites and graphite type thermal interface materials, may typically have a maximum thermal conductivity less than 400 W/mK.

It appears that vapor chambers with thermal conductivities in the range of 15000-27000 W/mK may be possible. However, the vapor chambers may not easily be suitable for device miniaturization. In particular, the vapor chambers may be restricted to either a planar configuration, at which maximum heat exchange may be achieved, or to a bent configuration with a bending radius such as, for example, 10 mm, which may block device miniaturization. In particular, prior art vapor chambers may collapse when bent at a smaller bending radius suitable for device miniaturization.

Hence, it is an aspect of the invention to provide an alternative vapor chamber, which preferably further at least partly obviates one or more of above-described drawbacks. The present invention may have as object to overcome or ameliorate at least one of the disadvantages of the prior art, or to provide a useful alternative.

Hence, in a first aspect the invention provides a vapor chamber element. The vapor chamber element may comprise a first plate and a second plate with a chamber (also "vapor chamber") in between, especially wherein the chamber has a first height (H1) (between the first plate and the second plate). The vapor chamber element may further comprise bridging elements bridging at least part of the first height (H1) (between the first plate and the second plate). In embodiments, the vapor chamber element may comprise a plurality of sections configured along a first axis (A). The plurality of sections may especially comprise (i) a bending section having a first volume fraction $V_1$ of bridging elements; and/or (ii) a basic section, especially at least two basic sections, having a second volume fraction $V_2$ of bridging elements. In specific embodiments, $2 \leq V_1/V_2$. In further embodiments, the bending section may be configured between at least two basic sections.

The vapor chamber (also: "VC") of the invention may provide the benefit that vapor chambers with a small bending radius may be obtained. In particular, the bending section may be relatively sturdy, which may facilitate bending of the vapor chamber, especially bending at a relatively low bending radius. In particular, the increased local density of bridging elements may prevent collapse of the chamber during bending. In particular, prior art vapor chambers may collapse while being bent at a small radius. The vapor chambers of the invention may be configured to prevent collapse due to distinct sections in the vapor chamber, wherein the bending sections (for bending) have additional structural support by having a locally increased density of bridging elements.

In specific embodiments, the invention may provide a vapor chamber element, wherein the vapor chamber element comprises a first plate and a second plate with a chamber in between, wherein the chamber has a first height (H1), wherein the vapor chamber element further comprises bridging elements bridging at least part of the first height (H1), wherein the vapor chamber element comprises a plurality of sections configured along a first axis (A), wherein the plurality of sections comprises (i) a bending section having a first volume fraction $V_1$ of bridging elements, and (ii) a basic section having a second volume fraction $V_2$ of bridging elements, wherein $2 \leq V_1/V_2$.

Hence, the invention may provide a vapor chamber element. Vapor chambers are known in the art and may be based on essentially the same principle as heat pipes (which are also known in the art). Both systems are known as "two-phase devices". Both two-phase devices may include a wick structure (sintered powder, mesh screens, and/or grooves) applied to the inside wall(s) of an enclosure (tube or planar shape). Liquid, such as water (e.g. for a copper device) or acetone (e.g. for an aluminum device), may be added to the device and the device may be vacuum sealed. The wick may distribute the liquid throughout the device. However, when heat is applied to one area of the two-phase device, the liquid turns to vapor and moves to an area of lower pressure where it cools and returns to liquid form whereupon it moves back to the heat source by virtue of capillary action (through the wick). A common wick structure may be a sintered wick type because it offers a high degree of versatility in terms of power handling capacity and ability to work against gravity. Mesh screen wicks may allow the heat pipe or vapor chamber to be thinner relative to a sintered wick. Also, a grooved wick may be applied. The grooves may act as an internal fin structure aiding in the evaporation and condensation. A difference between the heat pipe and the vapor chamber may be that the heat pipe may have an essentially rod-shaped shape, whereas the vapor chamber may in general include two essentially planar plates at a relative short distance (such as up to 5 mm. Further, for the vapor chamber the hot spot may relatively freely be chosen, whereas for a heat pipe there is a hot and cold side.

In embodiments, the vapor chamber element may comprise a first plate and a second plate, especially with a chamber in between. The first plate and the second plate may especially be arranged in parallel.

Materials of the first plate and the second plate may be selected from the group consisting of copper, stainless steel, aluminum and titanium. Hence, in embodiments, the first plate may comprise a material selected from the group comprising copper, stainless steel, aluminum, and titanium. In further embodiments, the second plate may comprise a material selected from the group comprising copper, stainless steel, aluminum, and titanium. Especially, both plates may consist of the same material. In specific embodiments, also material combinations may be applied, such as alloys.

In particular, in embodiments, over a substantial part of the first plate and a substantial part of the second plate, the plates may be configured parallel. For instance, over at least 50%, such as at least 80%, like at least 90% of an area of the first plate, and over at least 50%, such as at least 80%, like at least 90% of an area of the second plate, the plates may be configured parallel. Hence, over a substantial part of the first plate and a substantial part of the second plate, the "first height", i.e., the distance between the plates, may essentially not vary. The first plate and the second plate may especially approximate a (same) rectangular shape, such as a rounded rectangular shape.

In further embodiments, the first plate and the second plate may be shaped from a single plate. In particular, a single plate may have been bent to provide the first plate and the second plate, especially separated at a distance H1.

In further embodiments, the first plate and the second plate may be two separate plates. In particular, the first plate and the second plate may be welded together at their edges to provide a closed chamber. In further embodiments, the vapor chamber element may further comprise a plurality of side plates, bridging the first plate (also: "top plate") and the second plate (also: "bottom plate"), wherein the chamber is arranged in between the first plate, the second plate and the plurality of side plates. The vapor chamber element, especially the chamber defined by the plates, may have a shape approximating a cuboid, especially a bar, such as a cuboid with rounded (internal) corners.

In embodiments, the chamber may have a first height (H1), especially the average distance between the first plate and the second plate. In particular, as the first plate and the second plate may be arranged essentially in parallel, the first height H1 may be essentially constant throughout the chamber. In specific embodiments, the first height (H1) may be selected from the range of 50 μm-5 mm. In embodiments, the first height may be at maximum 1 mm. The first height may even be equal to or smaller than 0.4 mm, e.g. in the range of 100-400 μm, like 200-400 μm, such as at least 250 μm.

In embodiments, the vapor chamber element further comprises bridging elements bridging at least part of the first height (H1). The bridging elements may provide support to the vapor chamber element, especially to the chamber. In particular, in embodiments, the bridging elements may connect the first plate and the second plate, thereby improving the stability (or "rigidity") of the vapor chamber element. In embodiments, the bridging elements may especially comprise (supporting) columns. In embodiments, the columns are massive. In yet other embodiments, the columns may be hollow.

The vapor chamber element may especially comprise a plurality of sections configured along a first axis (A). In particular, the chamber may be sectioned into a plurality of sections along the first axis (A). The sections may especially be non-overlapping. The sections may especially be (essentially) defined by a plurality of planes perpendicular to the first axis (A), wherein each section comprises the part of the chamber in between the planes, i.e., in general, the plurality of sections are arranged along a single dimension. Hence, in embodiments the chamber may be defined by at least two sections, even more especially at least two sections (of which at least one is a bending section; see also below).

Each section may have a volume. The total volume of the sections is the volume of the vapor chamber. Note that the sections may enclose a wick structure, bridging elements, and may host at least part of the coolant (liquid and/or gas); see also below.

The plurality of sections may comprise a bending section. The bending section may especially be configured for bending, i.e., the vapor chamber element may be configured to be bent at the bending section. Hence, at least one of the sections is a bending section.

A bending section is part of the vapor chamber element wherein the vapor chamber element can be bent or is bent.

In particular, the bending section may have a first volume fraction $V_1$ of bridging elements. The phrase "volume fraction of bridging elements" may herein especially refer to a fraction of the section, which is a part of the chamber, that comprises bridging elements. In particular, each section may be divided into bridging elements, a wick structure, and open space, wherein the open space may, during operation, especially comprise liquid and/or gas.

The plurality of sections may further comprise a basic section, especially at least two basic sections, (each) having a second volume fraction $V_2$ of bridging elements.

In particular, in embodiments, $1.5 \leq V_1/V_2$, such as $2 \leq V_1/V_2$, especially $3 \leq V_1/V_2$, such as $5 \leq V_1/V_2$. In specific embodiments, the basic section may have a second volume fraction $V_2=0$. Hence, $V_2/V_1$ may be zero. However, in general, the basic section may have a non-zero volume fraction $V_2$. Hence, in further embodiments, $V_1/V_2 \leq 50$, such as $V_1/V_2 \leq 20$, especially $V_1/V_2 \leq 10$, such as $V_1/V_2 \leq 5$. Hence, the bending section may have a substantially higher volume fraction of bridging elements than the basic section.

Each bending section may enclose n1 bridging elements. Further, each basic section may comprise n2 bridging elements. Especially, n1≥10 and n2≥10.

In embodiments, the bending section may especially be configured between two basic sections.

The chamber may have a (first) height as defined by the (average) distance between the first plate and the second plate. The chamber may further have a (first) length (L1) and a (first) width (W1) perpendicular to the first height (H1). Hence, in embodiments each section may (also) have the (first) width (W1).

The vapor chamber element may comprise a first chamber end and a second chamber end defining the first length (L1). In general, the chamber will have a length and a width that are substantially larger than the height. Further, in general, the chamber will have a cross-section which is essentially rectangular. The vapor chamber element, especially the chamber, may have an axis of elongation. The axis of elongation may especially be an axis along which the length of the vapor chamber may be defined. Hence, the vapor chamber element may have an elongated shape having a longitudinal axis, especially wherein the first axis (A) is the longitudinal axis (of the vapor chamber element).

Further, in general the height may be much smaller than the length and/or width of the chamber. Hence, in specific embodiments the first length (L1) and the first height (H1) may have a ratio selected from the range of $L1/H1 \geq 10$, such as $\geq 20$, like selected from the range of 10-10,000. Alternatively or additionally, in specific embodiments the first width (W1) and the first height (H1) may have a ratio selected from the range of $W1/H1 \geq 10$, such as $\geq 20$, like selected from the range of 10-10,000. In further embodiments, the first axis (A) has a first length (L1) defining a length of the vapor chamber element, wherein the vapor chamber element has a first width (W1) (perpendicular to the first axis (A)), wherein $0.2 \leq L1/W1 \leq 5$.

In embodiments, the first length L1 may e.g. be selected from the range of 1-50 cm, such as 2-40 cm, like selected from the range of 2-20 cm, such as in the range of 4-15 cm, e.g. 5-12 cm. Likewise, this may apply to the first width. In general, in embodiments, the first width may be smaller than the first length.

The chamber volume may be at least about 1 $mm^3$, even more especially at least about 1 $cm^3$. In embodiments, the chamber volume may be at maximum about 25 $cm^3$, even more especially at maximum about 10 $cm^3$.

In embodiments, the first plate and the second plate may (respectively) have a first thickness ($d_1$) and a second thickness ($d_2$) independently selected from the range of 50-5000 μm, such as 100-2000 μm, like especially 300-2000 μm. The phrase "independently selected" and similar phrases may refer to embodiments wherein for the relevant elements the same value of the parameter is chosen, i.e. in these embodiments both plates may have the same thickness, but may also refer to embodiments wherein for the relevant elements different values of the parameter is chosen, i.e. in these embodiments both plates may have a thickness selected from the indicated range, but they may have different thicknesses. Further, in embodiments the first and second thickness(es) may also vary over the first plate and/or the second plate.

The thicknesses of the first plate and the second plate and the space between the plates may essentially define the thickness of the vapor chamber elements. Hence, in embodiments, the vapor chamber element may have an element thickness $d_e$, wherein $d_e = d_1 + d_2 + H1$.

In embodiments, the first volume fraction $V_1$ may be selected from the range of 0.05-0.5, especially from the range of 0.1-0.4, such as from the range of 0.15-0.3.

In general, the higher the volume fraction is that comprises the bridging elements, the stronger the (corresponding) section may be. However, a higher volume fraction comprising bridging elements may also result in a reduced movement of gas and/or liquid between the warm and cold sides of the vapor chamber, which may be detrimental to the heat exchange, especially cooling, provided by the vapor chamber. Hence, there may be a trade-off between the stability and the cooling capacity of the vapor chamber.

In particular, in embodiments wherein the vapor chamber element is to be bent at a single location, the vapor chamber element may be provided such that a bending section is arranged at the location where the vapor chamber element is to be bent, and wherein the remainder of the vapor chamber element, especially the chamber, may comprise basic sections, i.e., especially two basic sections. In further embodiments wherein the vapor chamber element is to be bent at multiple locations, the vapor chamber element may comprise a plurality of n bending sections arranged at the multiple locations where the vapor chamber element is to be bent, and the remainder of the vapor chamber element, especially the chamber, may comprise basic sections, i.e., especially at least n−1 basic sections, such as at least basic sections, or especially n+1 basic sections.

Hence, in embodiments comprising a basic section, aforementioned trade-off regarding the volume fraction comprising the bridging elements may be addressed. In particular, the vapor chamber element may locally in the bending sections comprise additional bridging elements—relative to the basic sections—to prevent collapse of the vapor chamber element during bending, and may in the basic sections comprise sufficient bridging elements for stability during normal operation, while facilitating movement of liquid and/or gas in the vapor chamber element.

In embodiments, the vapor chamber element may be configured for bending at the bending section. In particular, the bending section may be configured such that the bending section can be bent at a bending radius $r_b$, especially an inner bending radius $r_{bi}$, or an outer bending radius $r_{bo}$, wherein the bending radius $r_b \leq 3$ mm, such as $\leq 2$ mm, especially $\leq 1.5$ mm, such as $\leq 1$ mm.

The term "bending radius" may herein especially refer to the radius of the circle best approximating a bend. The bend may especially correspond to at least 10% of the circumference of the circle, such as to at least 20%, especially at least 45%. In specific embodiments, the bend may correspond to about 25% of the circumference of a circle, i.e., the vapor chamber element may be bent at a bending angle $\alpha_b$ of about 90°. In further embodiments, the bend may correspond to about 50% of the circumference of a circle, i.e., the vapor chamber element may be bent at a bending angle $\alpha_b$ of about 180°. Especially, the bent may be over e.g. 45° or 90° or 180°, though other angles may also be possible. Upon bending of a plate-shaped element, the plate may provide an inner bend and an outer bend, wherein the outer band may have a (slightly) bigger bending radius, especially dependent on the thickness of the plate-shaped element. Hence, the bending radius may especially refer to an inner bending radius. In yet further specific embodiments, the term "bending radius" may especially refer to an outer bending radius.

Hence, in embodiments, the vapor chamber element may be bent at the bending section, wherein the bending section has a bending radius $r_b$, wherein the bending radius $r_b \leq 2$ mm.

In embodiments, the bridging elements may bridge at least 50% of the first height H1, such as at least 70% of the first height, especially at least 90%, including 100%. In particular, the bridging elements may connect the first plate and the second plate, i.e., the first plate and the second plate may (at least) be connected via the bridging elements. Hence, the bridging elements may have heights of at least 0.5*H1, more especially at least 0.7*H1, yet even more especially at least about 0.9*H1.

In embodiments, the bridging elements are metal bridging elements. For instance, the bridging elements may be copper elements. Alternatively or additionally, the bridging elements may be ceramic bridging elements. Alternatively or additionally, the bridging elements may be plastic bridging elements. It will be clear to the person skilled in the art that the plastic bridging elements would comprise a plastic that has a suitable glass transition temperature (for use in a vapor chamber) and that would (essentially) not react with the liquid in the vapor chamber.

In further embodiments, the bridging elements may comprise (metal) columns. In particular, the columns may have a shape selected from the group consisting of a sphere, a plate, and a cylinder.

The columns may in embodiments have a circular cross-section. In other embodiments the columns may have a square cross-section. In yet other embodiments, the columns may have an n-gonal cross-section, wherein n is at least 5, like hexagonal (n=6), or octagonal (n=8).

Especially, in embodiments the bridging elements may have a shape approximating a sphere. The spherical shape may be particularly convenient for construction of the vapor chamber element while providing a good stability.

In embodiments wherein the bridging elements have a spherical shape, the diameter of the bridging elements may especially be selected from the range of $0.8^*H_1$-$H_1$. In particular, the diameter of the spherical bridging elements may be the first height.

In embodiments wherein the bridging elements have a cylindrical shape, the height of the cylinder may especially be arranged parallel to the first height $H_1$. Further, the diameter of the cylinder may especially be selected from the range of $0.8^*H_1$-$H_1$. In particular, the diameter of the cylindrical bridging elements may be equal to the first height.

Hence, the bridging elements may have an equivalent circular diameter selected from the range of about $0.8^*H_1$-$H_1$. The equivalent circular diameter (or ECD) of an (irregularly shaped) two-dimensional shape is the diameter of a circle of equivalent area. For instance, the equivalent circular diameter of a square with side a is $2^*a^*SQRT(1/\pi)$. For a circle, the diameter is the same as the equivalent circular diameter. Would a circle in an xy-plane with a diameter D be distorted to any other shape (in the xy-plane), without changing the area size, than the equivalent circular diameter of that shape would be D. However, the bridging elements may also have cross-sections having larger equivalent circular diameters, such as selected from the range of about $0.8^*H_1$-$H_1$. Especially, the bridging elements may have cross-sections having equivalent circular diameters equal to or smaller than about 0.2*W1, even more especially at maximum 0.05*W1.

In embodiments wherein the bridging elements have a plate shape, the plate may especially be placed in direction of the (intended) flow. Hence, the flow direction is chosen in the direction of the length of the plate(s).

In embodiments, the bridging elements have provided by a corrugated element. Hence, in embodiments the vapor chamber may enclose an element, such as a corrugated element, which may consist of the bridging elements or which may consist of bridging elements and connector elements between the bridging elements. In specific embodiments, the bridging elements are connected elements which may form a corrugated structure.

Especially, the bridging elements may in embodiments thus extend from the wick structure. For instance, in embodiments the wick structure(s) may have a height of at maximum 0.4*H1, such as at maximum 0.25*H1.

Hence, in embodiments, the wick structure may be arranged in the bending section and/or the basic section, especially in the bending section, or especially in the basic section.

The columns may, with regards to the first axis, have one or two neighboring columns, i.e., the first and last column with regards to the first axis have a single neighboring column, whereas all other columns have two neighbors. As the volume fraction of bridging elements may depend on the type of section, the longest distance along the first axis (A) to a neighboring column may also depend on (or be indicative of) the type of section. The term "longest distance" may herein especially refer to the longer of the two distances of a column to its two neighboring columns along the first axis (A). With regards to a column that only has a single neighboring column, the term "longest distance" refers to the distance to that neighboring column. Each distance may especially be the shortest distance between the column and the neighboring column.

Hence, in embodiments, a column in the bending section may have a first longest column distance $C_1$, whereas a column in the basic section may have a second longest column distance $C_2$, wherein $C_1 \geq 2^*C_2$, especially $C_1 \geq 3^*C_2$, such as $C_1 \geq 5^*C_2$.

In further embodiments, the columns, especially the columns in the bending section, may have a circular equivalent diameter $d_c$, wherein the columns in the bending section have a first longest column distance $C_1 \leq 2^*d_c$, especially $C_1 \leq 1.5^*d_c$. In particular, $C_1$ may be selected from the range of $0.5^*d_c$-$2^*d_c$, especially from the range of $0.75^*d_c$-$1.5^*d_c$.

In further embodiments, the chamber may comprises a wick structure. In particular, the chamber, especially the wick structure, may comprise a first wick structure associated with the first plate, especially arranged in physical contact with the first plate, and/or a second wick structure associated with the second plate, especially arranged in physical contact with the second plate.

In further embodiments, the wick structure may comprise (at least part of) the bridging elements, i.e., the bridging elements may at least partly be comprised by the wick structure.

In embodiments, the bending section may have a bending length $l_b$ along the first axis (A). The bending length may especially be selected to be sufficient to provide the bend. The bending length $l_b$ may especially be selected on the basis of the bend that is desired. In particular, the larger the angle of the desired bend, the larger the bending length $l_b$ may be to facilitate acquiring the desired bend. Similarly, the larger the thickness of the vapor chamber element, the larger the required bending length $l_b$ may need to be to achieve a specific angle. Hence, in embodiments, $l_b \geq \pi^*(r_b+d_e)/(360/\alpha_b)$, wherein $r_b$ is the bending radius, and wherein $\alpha_b$ is the bending angle.

In further embodiments, the bending section may be configured to provide adjacent support subsections adjacent to the bend. Hence, the bending section 131 may comprise a bending subsection 132 configured to provide the bend, and two support subsections 134 arranged at either side of the bending subsection 134. In particular, each support subsection may have a support length $l_s$ selected from the range of $3^*d_e$-$20^*d_e$, such as from the range of $5^*d_e$-$10^*d_e$. Hence, the bending length $l_b$ may especially be at least $\pi^*(r_b+d_e)/(360/\alpha_b)+2^*3^*d_e$, such as $\pi^*(r_b+d_e)/(360/\alpha_b)+2^*5^*d_e$. In further embodiments, the bending length $l_b$ may especially be selected from the range of $\pi^*(r_b+d_e)/(360/\alpha_b)+2^*3^*d_e$–$\pi^*(r_b+d_e)/(360/\alpha_b)+2^*20^*d_e$, or especially from the range of $\pi^*(r_b+d_e)/(360/\alpha_b)+2^*5^*d_e$–$\pi^*(r_b+d_e)/(360/\alpha_b)+2^*10^*d_e$.

Hence, in specific embodiments, the vapor chamber element has an element thickness $d_e$, wherein the bending section is configured to provide a bend having a bend angle $\alpha_b$ and a bend radius $r_b$, wherein the bending section has a bending length $l_b$ (along the first axis (A)), and wherein the bending length $l_b$ is selected from the range of $\pi^*(r_b+d_e)/(360/\alpha_b)+2^*5^*d_e$–$\pi^*(r_b+d_e)/(360/\alpha_b)+2^*10^*d_e$. It will be clear to the person skilled in the art that the bending length $l_b$ (along the first axis (A)) may especially be defined prior to the bend being made. In particular, in embodiments, the bending radius may be the inner radius in the bend of the inner plate in the bend.

In further embodiments, the vapor chamber element may comprise n bending sections, especially wherein n is selected from the range of 2-10, such as from the range of 2-4.

In a second aspect, the invention provides a method for providing a bent vapor chamber element. The method may comprise bending the vapor chamber element of the invention along the bending section to provide the bent vapor chamber element.

In embodiments, the method may comprise closing the (bent) vapor chamber element, especially by welding. In particular, the method may comprise closing of the vapor chamber element after bending of the vapor chamber element.

The closing of the vapor chamber element may especially leave a single opening for filling of the VC with a liquid, especially a coolant.

Hence, the method may further comprise filling the (bent) vapor chamber element with a liquid, especially a coolant. In particular, the method may comprise filling the vapor chamber element after bending of the vapor chamber element, and especially after closing of the vapor chamber element (by welding).

After filling of the vapor chamber element, the vapor chamber element may be sealed. Hence, in further embodiments, the method may comprise sealing of the vapor chamber element.

In a further aspect the invention provides a bent vapor chamber element obtainable with the method of the invention.

In embodiments, the bending section may be bent at a bending radius $r_b$, especially wherein the bending radius $r_b \leq 3$ mm, such as ≤2 mm, especially ≤1.5 mm.

In a further aspect the invention provides a device comprising the bent vapor chamber element of the invention.

In embodiments, the device may further comprise an electronic component. The electronic component may especially be thermally coupled, especially directly physically coupled (i.e. in physical contact), to the bent vapor chamber element. In particular, the vapor chamber element may be arranged in thermal coupling with the electronic component in order to cool the electronic component, i.e., the vapor chamber element may be configured in a heat exchanging relationship with the electronic component.

Especially, the term "thermal contact" indicates that an element can exchange energy through the process of heat with another element. In embodiments, thermal contact may be achieved between two elements when the two elements are arranged relative to each other at a distance of equal to or less than about 10 μm, though larger distances, such as up to 100 μm may be possible. The shorter the distance, the better the thermal contact. Especially, the distance is 10 μm or less, such as 5 μm or less. The distance may be the distanced between two respective surfaces of the respective elements. The distance may be an average distance. For instance, the two elements may be in physical contact at one or more, such as a plurality of positions, but at one or more, especially a plurality of other positions, the elements are not in physical contact. For instance, this may be the case when one or both elements have a rough surface. Hence, in embodiments in average the distance between the two elements may be 10 μm or less (though larger average distances may be possible, such as up to 100 μm). In embodiments, the two surfaces of the two elements may be kept at a distance with one or more distance holders.

Herein, the term "thermal contact" may especially refer to an arrangement of elements that may provide a thermal conductivity of at least about 10 W/mK, such as at least 20 W/mK, such as at least 50 W/mK. In embodiments, the term "thermal contact" may especially refer to an arrangement of elements that may provide a thermal conductivity of at least about 150 W/mK, such as at least 170 W/mK, especially at least 200 W/mK. In embodiments, the term "thermal contact" may especially refer to an arrangement of elements that may provide a thermal conductivity of at least about 250 W/mK, such as at least 300 W/mK, especially at least 400 W/mK.

In embodiments, the device may comprise a housing. In particular, the housing may comprise the bent vapor chamber element, and especially the electronic component.

In further embodiments, the housing may internally have a rounded corner, especially wherein the rounded corner is configured for hosting the (bending section of) the bent vapor chamber element. In particular, the bending section of the vapor chamber element may be arranged in physical contact with the rounded corner at a contact interface, especially wherein the bending section and the rounded corner have (essentially) the same radius at the contact interface. Thereby, the bent vapor chamber element and the housing may efficiently exchange heat, also at the corner of the housing element. Otherwise, air may be trapped between the housing and the bent vapor chamber element, which may inhibit efficient heat exchange at the corner. Further, the rounded corner may provide increased stability to the device, as the bent vapor chamber is spatially constrained in such embodiments.

In further embodiments, the device may comprise a plurality of bent vapor chamber elements.

In specific embodiments, the device may comprise a light generating device. The light generating device comprises one or more light sources. Especially, in embodiments the one or more light sources comprise solid state light sources. For instance, the one or more light sources may comprise LEDs. The one or more light sources are configured to generate light source light, such as in embodiments LED light. The light generating device is especially configured to generate device light, comprise light of the one or more light sources, or especially consisting of the light of the one or more light sources. In embodiments, the device light may be white light. Would the spectral power distribution of the device light be controllable, then the device light may be white light in one or more operational modes of the light generating device.

In further specific embodiments, the device may comprise a driver unit comprising a driver, wherein the driver is thermally coupled with the bent vapor chamber element. For instance, the driver may be physically coupled to the vapor chamber element.

In particular, the light generating device may comprise an LED light generating device. For instance, the LED light generating device may be physically coupled to the vapor chamber element.

The light generating device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, or LCD backlighting.

In a specific embodiment, the light source comprises a solid state LED light source (such as a LED or laser diode).

The term "light source" may also relate to a plurality of light sources, such as 2-20 (solid state) LED light sources. Hence, the term LED may also refer to a plurality of LEDs.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1A:
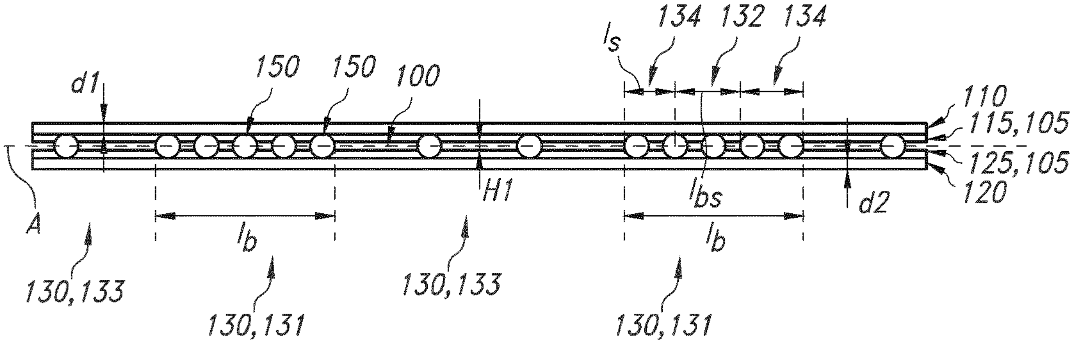
FIG. 1A-B schematically depict embodiments of the vapor chamber element.

FIG. 1A schematically depicts an embodiment of the vapor chamber element (1000). In the depicted embodiment, the vapor chamber element 1000 comprises a first plate 110 and a second plate 120 with a chamber 100 in between. The chamber 100 has a first height H1. The vapor chamber element 1000 further comprises bridging elements 150 bridging at least part of the first height H1. The vapor chamber element 1000 further comprises a plurality of sections 130 configured along a first axis A. In the depicted embodiment, the plurality of sections 130 comprise a bending section 131 having a first volume fraction $V_1$ of bridging elements 150. The plurality of sections further comprises a basic section 133 having a second volume fraction $V_2$ of bridging elements 150, especially wherein the bending section 131 is configured (directly) between two basic sections 133, i.e., in embodiments the bending section 131 may border two basic sections 133.

In particular, in embodiments, $2 \leq V_1/V_2 \leq 20$.

In embodiments, the bending section 131 may have a first volume fraction $V_1$ of bridging elements selected from the range of 0.05-0.5, such as from the range of 0.1-0.4, especially from the range of 0.15-0.35.

In the depicted embodiment, the bridging elements 150 comprise columns 151, especially columns 151 having a shape selected from the group consisting of a sphere, a plate, and a cylinder, such as especially spherical columns.

In embodiments, the vapor chamber element 1000, especially the chamber 100, may comprise a wick structure 105. The wick structure may especially comprise a first wick 115 associated to the first plate 110 and a second wick 125 associated to the second plate 120.

In further embodiments, the bridging elements 150 may be at least partly comprised by the wick structure 105.

The bending section 131 may have a bending length $l_b$ along the first axis A, especially wherein the bending length $l_b \geq 0.5$ mm.

The first plate 110 and the second plate 120 may, in embodiments, have (respectively) a first thickness $d_1$ and a second thickness $d_2$ independently selected from the range of 50-5000 μm.

In the depicted embodiment, the vapor chamber element 1000 comprises a single bending section 131. However, in further embodiments the vapor chamber element may comprise a plurality of bending sections 131, especially n bending sections 131, especially wherein n is selected from the range of 2-10, such as from the range of 2-4.

Figure 1B:
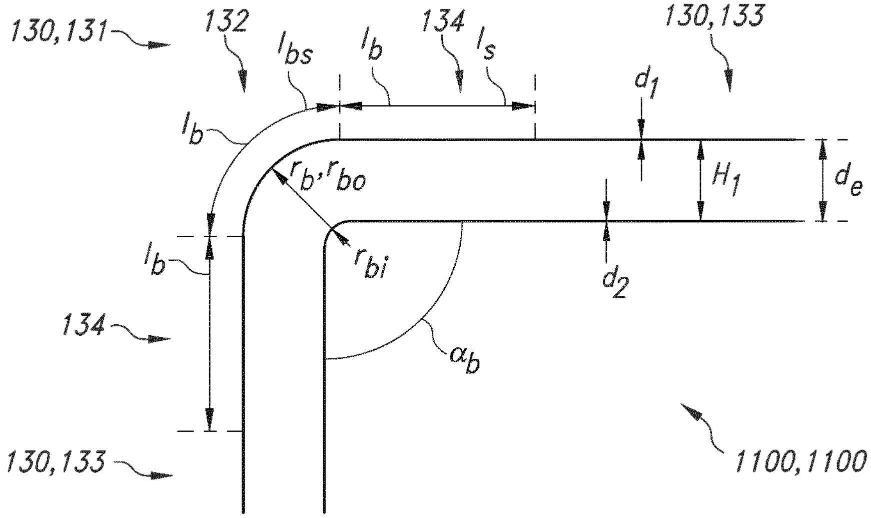

FIG. 1A depicts the vapor chamber element 1000 before bending. FIG. 1B schematically depicts the vapor chamber element 1000 after bending at the bending section 131. In particular, the bending section 131 may have a bending radius $r_b$, especially an inner bending radius $r_{bi}$, or especially an outer bending radius $r_{bo}$, and especially wherein the bending radius $r_b \leq 2$ mm.

In the depicted embodiment, the vapor chamber element 1000 has an element thickness $d_e$. The element thickness $d_e$ is essentially the sum of the first height H1, the first thickness $d_1$ and the second thickness $d_2$.

In embodiments, the bending section 131 may be configured to provide a bend having a bend angle $\alpha_b$ and a bend radius $r_b$.

In embodiments, the bending section 131 may have a bending length $l_b$ along the first axis (A), especially wherein the bending length $l_b$ is selected from the range of $\pi^*(r_b+d_e)/(360/\alpha_b)+2^*5^*d_e-\pi^*(r_b+d_e)/(360/\alpha_b)+2^*10^*d_e$.

In the depicted embodiment, the bending section 131 has a bending length $l_b$. In particular, the bending section 131 comprises a bending subsection 132 having a bending subsection length $l_{bs}$ and two support subsections 134 having a support length $l_s$. Hence, $l_b=l_s+2l_{bs}$. The bending subsection length $l_{bs}$ may especially be $\pi^*(r_b+d_e)/(360/\alpha_b)$.

Figure 2A:
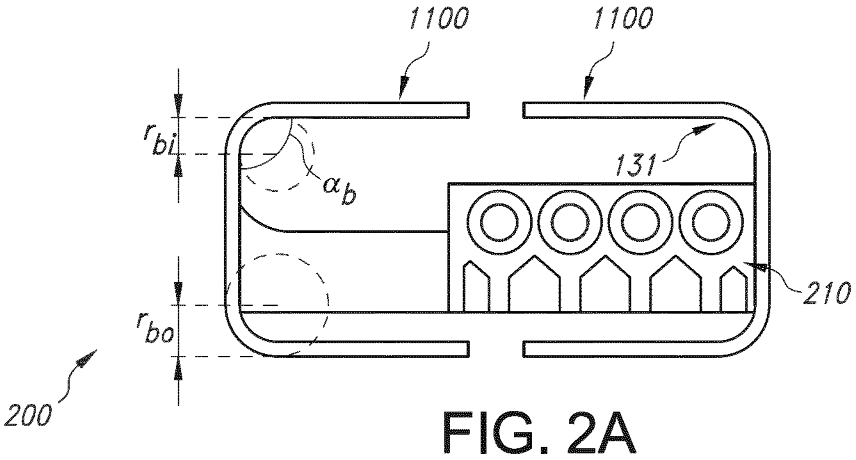
FIG. 2A-C schematically depict an embodiment of the device comprising a bent vapor chamber element.
Figure 2B:
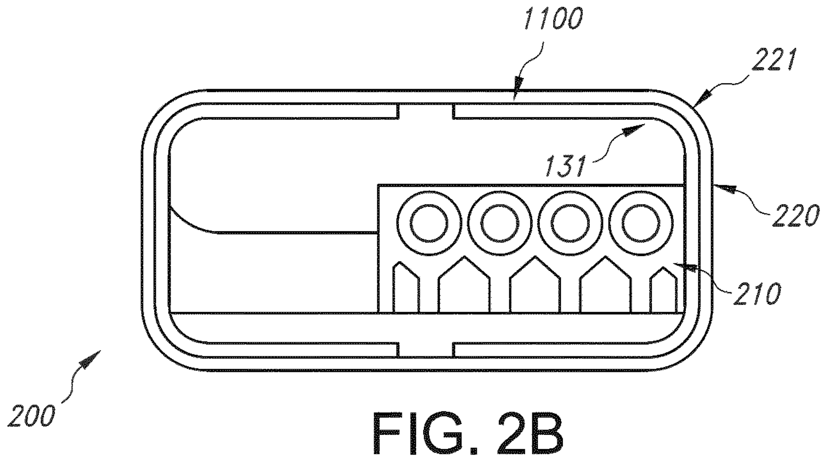
Figure 2C:
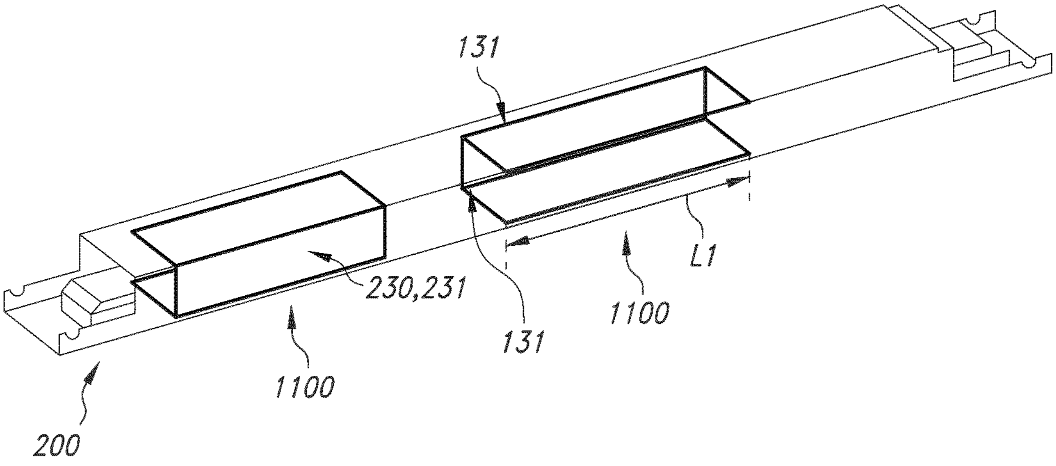

FIG. 2A-C schematically depict embodiments of the device 200 comprising a bent vapor chamber element 1100. In particular, FIG. 2A-C depict a device 200 comprising a bent vapor chamber element 1100, wherein the device 200 further comprises an electronic component 210 thermally coupled, especially directly physically coupled, to the bent vapor chamber element 1100.

FIG. 2A schematically depicts an embodiment of the device wherein the device comprises a plurality of bent vapor chamber elements 1100, especially 2 bent vapor chamber elements 1100. In particular, each of the depicted bent vapor chamber elements 1100 comprises n bending sections 131, wherein n=2.

In further embodiments, the device 200 may comprise both (unbent) vapor chamber elements 1000 and bent vapor chamber elements 1100.

In the depicted embodiment, the bending section 131 is bent at a bending radius $r_b$, wherein the bending radius $r_b \leq 2$ mm. In particular, the bending radius $r_b$ corresponds to the radius of a circle matching the circle section defined by the bending section (after bending). For explanatory purposes, a matching circle is depicted in FIG. 2A. In particular, in the depicted embodiment, the bending angle $\alpha_b$ may be about 90°.

FIG. 2B schematically depicts an embodiment of a device 200 comprising a single bent vapor chamber element 1100, wherein the bent vapor chamber element 1100 comprises n bending sections 131, wherein n=4.

In the depicted embodiment, the device 200 comprises a housing 220. The housing may comprise the bent vapor chamber element 1100 and the electronic component 120. In particular, in the depicted embodiment, the housing 220 internally has a rounded corner 221 (or: "has a rounded internal corner 221"), wherein the bending section 131 of the vapor chamber element 1100 is arranged in physical contact with the rounded corner 221 at a contact interface. In the depicted embodiment the bending section and the rounded corner have (essentially) the same radius at the contact interface, i.e., there is (essentially) no empty space between the housing 220 and the bent vapor chamber element 1100 at the rounded corner 221. In particular, the rounded corner is configured for hosting the bent section 131 of the bent vapor chamber element 1100.

FIG. 2C also schematically depicts an embodiment of the device wherein the device comprises a plurality of bent vapor chamber elements 1100, especially 2 bent vapor chamber elements 1100. In particular, each of the depicted bent vapor chamber elements 1100 comprises n bending sections 131, wherein n=2. In particular, in this embodiment, the bent vapor chamber elements 1100 are arranged at those areas of the device where heat-generating elements are located.

Figure 3:
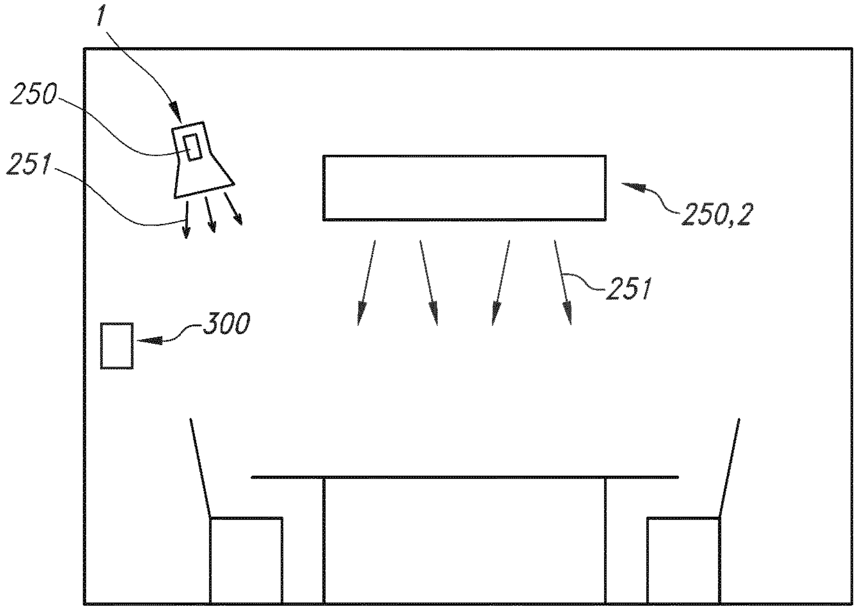
FIG. 3 schematically depicts embodiments of a luminaire and a lamp comprising the device of the invention.

FIG. 3 schematically depicts an embodiment of a luminaire 2 comprising a light generating device 250 comprising the device 200 described above. Reference 300 indicates a control system 300, especially a control system comprising a user interface. The control system may especially be functionally coupled with the light generating device 250. FIG. 3 also schematically depicts an embodiment of a lamp 1 comprising the light generating device 250.

In embodiments, the device 200 may comprise a light generating device.

In further embodiments, the device 200 may comprises a driver unit 230 comprising a driver 231, wherein the driver 231 is thermally coupled with the bent vapor chamber element 1100.

The term "plurality" refers to two or more. Furthermore, the terms "a plurality of" and "a number of" may be used interchangeably.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. Moreover, the terms "about" and "approximately" may also relate to 90% or higher, such as 95% or higher, especially 99% or higher, even more especially 99.5% or higher, including 100%. For numerical values it is to be understood that the terms "substantially", "essentially", "about", and "approximately" may also relate to the range of 90%-110%, such as 95%-105%, especially 99%-101% of the values(s) it refers to.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

The term "further embodiment" and similar terms may refer to an embodiment comprising the features of the previously discussed embodiment, but may also refer to an alternative embodiment.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", "include", "including", "contain", "containing" and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings. Moreover, if a method or an embodiment of the method is described being executed in a device, apparatus, or system, it will be understood that the device, apparatus, or system is suitable for or configured for (executing) the method or the embodiment of the method respectively.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A vapor chamber element, wherein the vapor chamber element comprises a first plate and a second plate with a chamber in between, wherein the chamber has a first height, wherein the vapor chamber element further comprises bridging elements bridging at least part of the first height, wherein the vapor chamber element comprises a plurality of sections configured along a first axis, wherein the plurality of sections comprises (i) a bending section having a first volume fraction $V_1$ of bridging elements, and (ii) a basic section having a second volume fraction $V_2$ of bridging elements, wherein $2 \leq V_1/V_2$.

2. The vapor chamber element according to claim 1, wherein the first volume fraction $V_1$ is selected from the range of 0.1-0.4.

3. The vapor chamber element according to claim 1, wherein the bridging elements comprise columns.

4. The vapor chamber element according to claim 1, wherein the chamber comprises a wick structure, wherein the wick structure comprises a first wick associated to the first plate and a second wick associated to the second plate.

5. The vapor chamber element according to claim 4, wherein one or more of the bridging elements are at least partly comprised by the wick structure.

6. The vapor chamber element according to claim 1, wherein the vapor chamber element has an element thickness $d_e$, wherein the bending section is configured to provide a bend having a bend angle $\alpha_b$ and a bend radius $r_b$, wherein the bending section has a bending length $l_b$ along the first axis, and wherein the bending length $l_b$ is selected from the range of $\pi*(r_b+d_e)/(360/\alpha_b)+2*5*d_e-\pi*(r_b+d_e)/(360/\alpha_b)+2*10*d_e$.

7. The vapor chamber element according to claim 1, wherein the first plate and the second plate have a first thickness $d_1$ and a second thickness $d_2$ independently selected from the range of 50-5000 μm.

8. The vapor chamber element according to claim 1, wherein the vapor chamber element comprises n bending sections, wherein n is selected from the range of 2-4, and wherein basic sections are arranged between each two neighboring bending sections.

9. The vapor chamber element according to claim 1, wherein the first axis has a first length defining a length of the vapor chamber element, wherein the vapor chamber element has a first width, wherein $0.2 \leq L1/W1 \leq 5$.

10. The vapor chamber element according to claim 1, wherein the vapor chamber element is bent at the bending section, wherein the bending section has a bending radius, wherein the bending radius ≤2 mm.

11. A method for providing a bent vapor chamber element, the method comprising:

bending a vapor chamber element according to claim 1 in an unbent state, along the bending section to provide the bent vapor chamber element;

filling the bent vapor chamber element with a coolant;

sealing the bent vapor chamber element.

12. A device comprising the vapor chamber element of claim 10, wherein the device further comprises an electronic component thermally coupled to the bent vapor chamber element.

13. The device according to claim 12, wherein the device comprises a housing, wherein the housing internally has a rounded corner, wherein the bending section of the vapor chamber element is arranged in physical contact with the rounded corner at a contact interface, wherein the bending section and the rounded corner have the same radius at the contact interface.

14. The device according to claim 12, wherein the device comprises a light generating device.

15. The device according to claim 12, wherein the device comprises a driver unit comprising a driver, wherein the driver is thermally coupled with the bent vapor chamber element.

* * * * *